Figure 4:
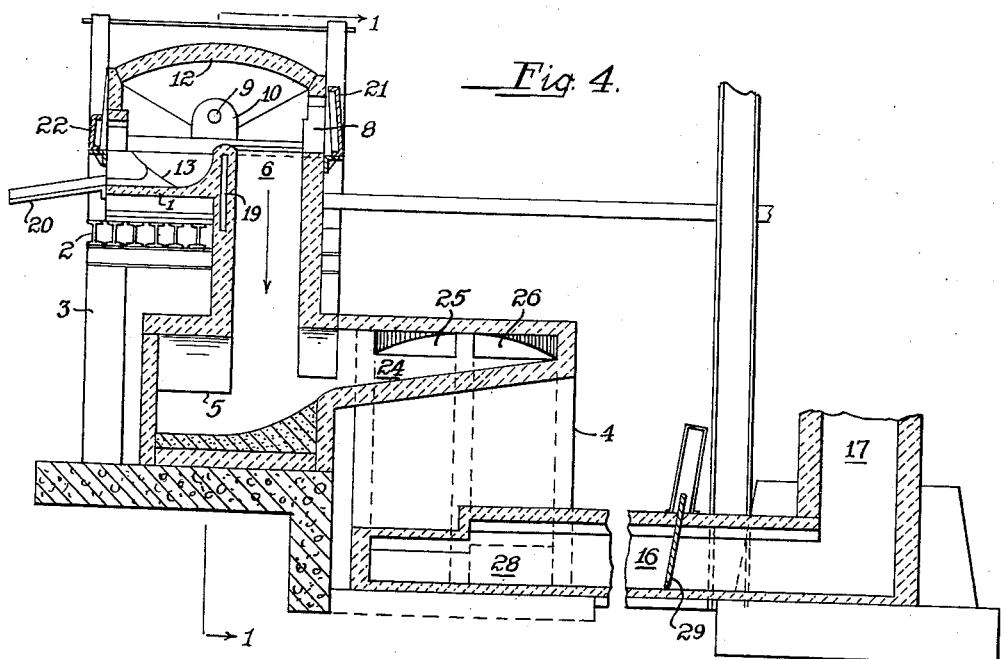

Sept. 19, 1939.  W. A. MORTON ET AL  2,173,592
OPEN HEARTH FURNACE
Filed March 26, 1937  3 Sheets-Sheet 1
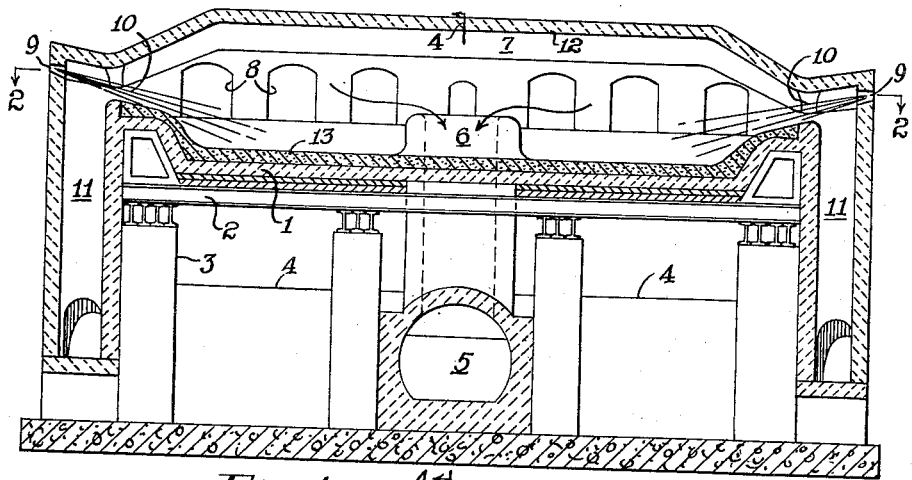
Fig. 1.
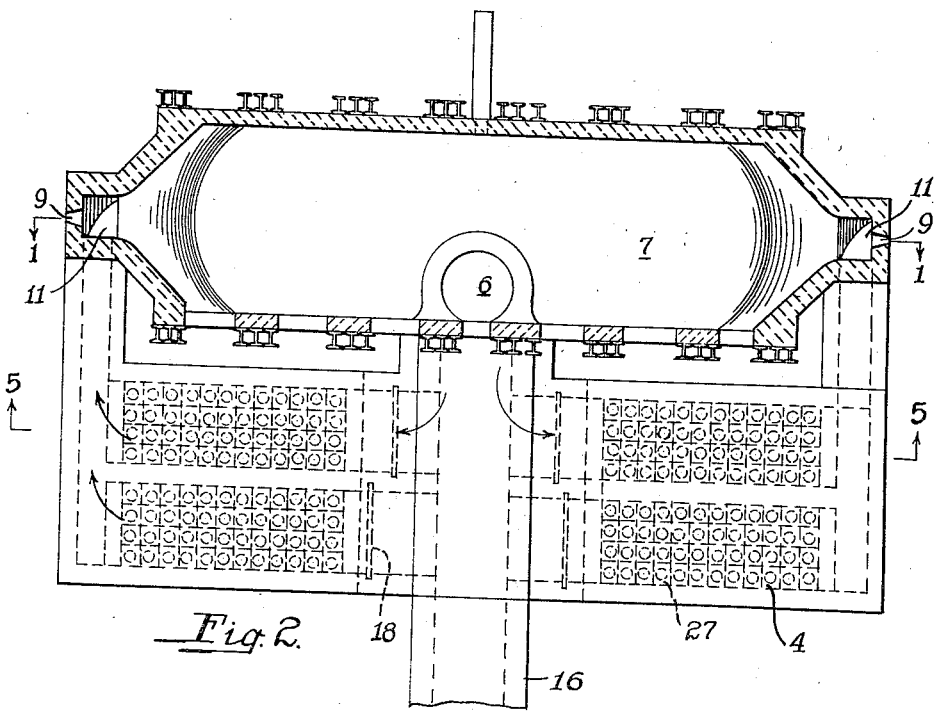
Fig. 2.
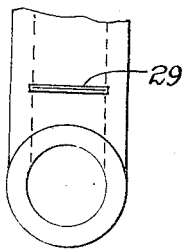
INVENTOR
William A. Morton
and Harold F. Spencer
by William B. Jaspert
Attorney.

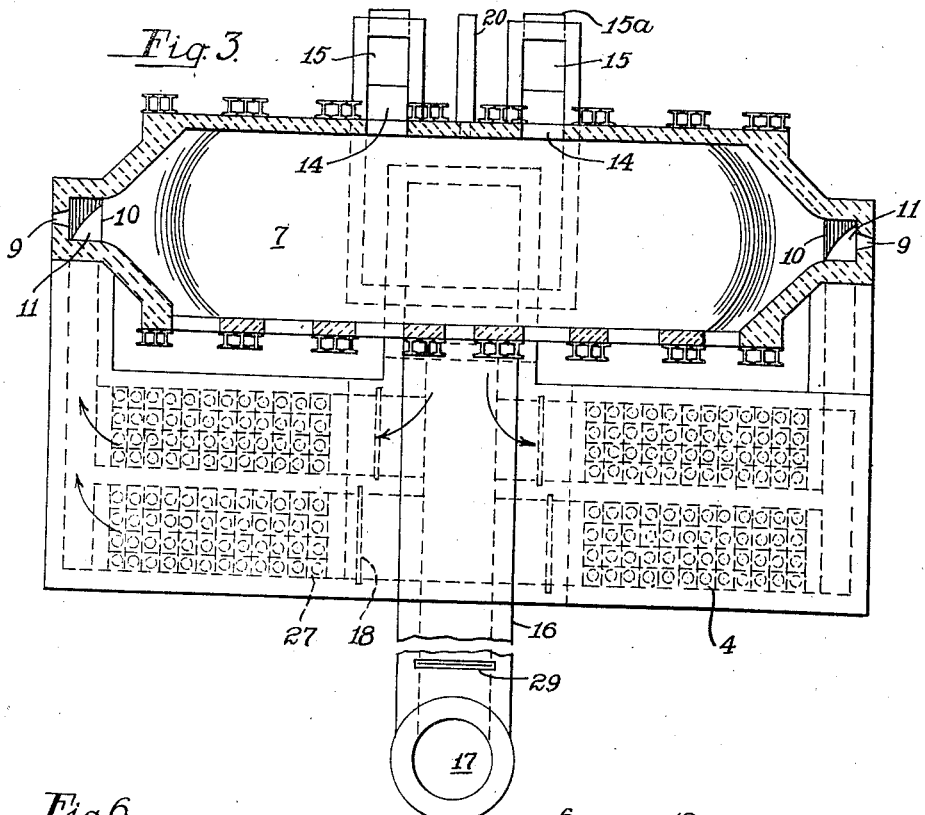
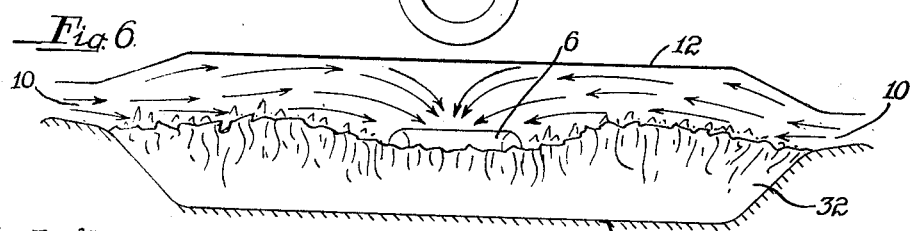
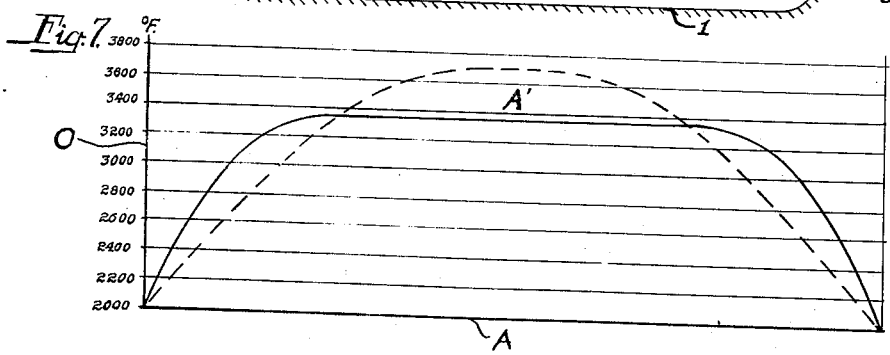

Sept. 19, 1939.  W. A. MORTON ET AL  2,173,592
OPEN HEARTH FURNACE
Filed March 26, 1937  3 Sheets—Sheet 3

INVENTOR
William A. Morton
and Howard F. Spencer
by William B. Jaspert
Attorney.

Patented Sept. 19, 1939

2,173,592

UNITED STATES PATENT OFFICE 2,173,592

OPEN HEARTH FURNACE

William A. Morton, Mount Lebanon, and Howard F. Spencer, Pittsburgh, Pa., assignors to Amco, Incorporated, Pittsburgh, Pa., a corporation of Pennsylvania Application March 26, 1937, Serial No. 133,148

2 Claims. (Cl. 266—33)

This invention relates to new and useful improvements in open hearth structures, and it is among the objects thereof to provide open hearth furnaces for melting and refining steel, in which the charge is dual fired from opposite ends of the hearth by continuous application of the heating flame.

Open hearth furnaces of the regenerative reversing type are fired from one direction only, the products of combustion and preheated air from the regenerator entering the furnace at one end of the charge, and the products of combustion exiting the furnace at the opposite end of the charge. In this type of open hearth furnace, high temperatures prevail at the end of the hearth where combustion takes place, whereas at the discharge or exit end for the waste gases, the temperatures are below that required to produce the proper accelerative melting and metallurgical effect upon the materials charged into the furnace. Upon the periodic reversal of firing, these unbalanced temperature conditions are reversed.

In accordance with the present invention, constant and uniform progressively increasing temperature conditions are obtainable throughout the furnace chamber. The charge responding to the constant temperature environment will likewise be of uniform temperature resulting in a faster rate of melting and refining of the bath.

In the conventional regenerative type furnaces, the heating flame must be extended over substantially the entire length of the furnace, hence higher burner velocities are maintained, resulting in increased localization of heat and consequent roof erosion. In the regenerative type there is considerable erosion of the burner ports by the materials carried by the high velocity gases. The ports alternately function as waste gas exit ports and burners requiring both ports to be water-cooled, and because of erosive effect on the ports, which gradually increases their size, excess air is required to maintain necessary port velocities. Also, because of the temperature swing of the regenerator chambers due to the reversing of the furnace, there is constant expansion and contraction of the furnace structure, with resultant substantial loss of heat from infiltration of air, making it more difficult to control the temperature conditions and a gradually lowering of the thermal efficiency of the furnace.

In accordance with the present invention, the open hearth furnace is constantly fired from opposite ends with the waste gases exiting at substantially the center of the furnace, thus permitting firing at a somewhat lower initial temperature as the temperature from end to end of the furnace is virtually in balance. As only the exit waste gas ports need be water-cooled, there is little or no erosive action on the burner ports, and losses from oxidation will be reduced by the correct constant port calibration, as no variation in the supply of preheated air is necessary. Also because of the maintenance of constant operating conditions, it will not be necessary to construct the parts of a size in excess of the required capacity and substantial savings in initial cost and maintenance is obtained with resultant fuel economy and elimination of excessive circulating cooling water.

Figure 5:
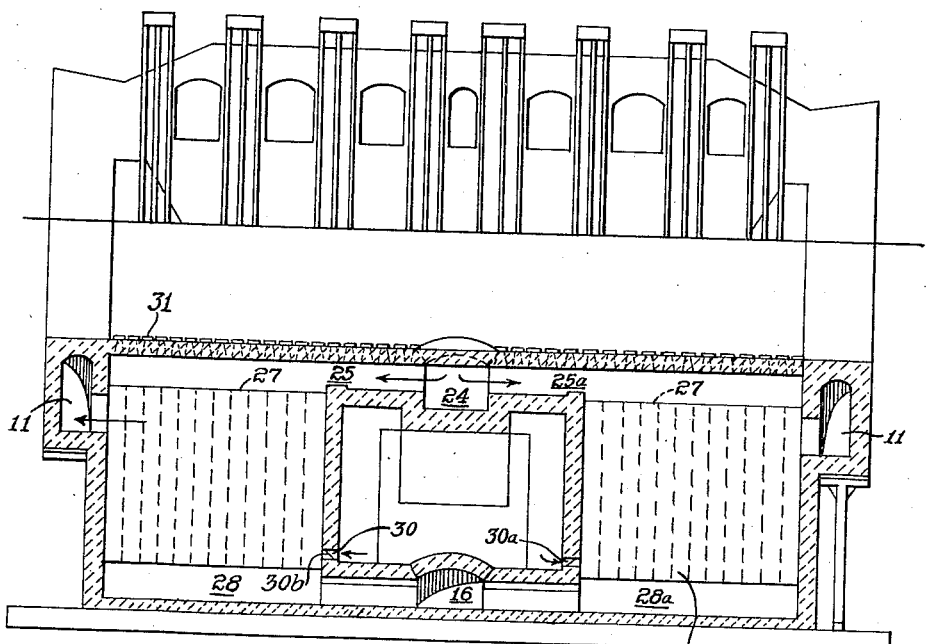

Such a furnace adapted for dual firing is shown in the accompanying drawings constituting a part hereof in which like reference characters designate like parts and in which:

Fig. 1 is a vertical cross-sectional view of an open hearth furnace embodying the principles of this invention taken along the line 1—1, Fig. 2;

Fig. 2 a plan view partially in section taken along the line 2—2, Fig. 1;

Fig. 3 a similar view illustrative of a modification of the waste gas exit of the furnace;

Fig. 4 a vertical transverse section taken along the line 4—4, Fig. 1;

Fig. 5 a vertical sectional elevational view of the furnace taken through the recuperator structure along the line 5—5, Fig. 2;

Fig. 6 a diagrammatic view of the furnace hearth and chamber illustrating the application and flow of the products of combustion relative to the furnace charge and the waste gas exit port; and Fig. 7 a chart of the relative temperature conditions of the dual fired furnace and the regenerative type.

With reference to Figs. 1 and 2 of the drawings, the structure therein illustrated consists of a hearth 1 supported on I-beams 2 resting on concrete piers 3 or the like, the numeral 4 generally designating a plurality of recuperator structures, 5 the slag pocket, 6 the waste gas exit port, 7 the combustion chamber, 8 charging doors or openings, 9 the burner ports, 10 the firing ports, and 11 the preheated air passages from the recuperator structures and 12 the roof structure.

The hearth 1 is provided with a lining 13, which is renewable with each charge, and the materials to be melted are dumped on the hearth as illustrated diagrammatically in Fig. 6 of the drawings. The burner ports are slightly elevated to impinge the flame at a slight inclination against the material supported on the hearth. The material is charged through openings 8, and the products of combustion pass from the firing ports 10 at the respective ends of the furnace to the outlet port 6 at the center of the furnace.

In the modification shown in Fig. 3, the waste gas exit consists of a pair of spaced ports 14 instead of a single port 6, as in Figs. 1 and 2, the exit ports communicating with waste gas passages 15, which in turn have a common passage 16 to a stack 17. Passages 15 are separately controlled by dampers 15a and the volume of waste gases drawn through the respective recuperators are controlled by individual dampers 18, which may be water cooled, as is the exit port 6 and the exit ports 14, because of the prevailing high temperatures.

The passage of the waste gases from the furnace chamber to and through the recuperators is more clearly illustrated in Fig. 4 of the drawings. As therein shown, the exit port 6 is jacketed by a cooling chamber 19 through which water is circulated. The hearth 1 is provided with a spout 20 for tapping the charge, and the charging openings and peep holes are provided with doors 21 and 22.

The waste gases leaving the furnace pass downwardly into a collecting chamber or slag pocket 5, thence make a right angle turn into the passage 24 from which they enter passages 25 and 26 of the recuperators 4, thence downwardly through the recuperator tile structure 27 to the common waste gas collecting chambers 28 at the bottom of the recuperators, thence to the stack passage 16 into the stack 17, a damper 29 being provided to regulate the draft. Solid particles entrained in the waste gases will be collected in slag pockets 5 from which they are removed, the sharp turn in the direction of the flow of the gases to the recuperators aiding in allowing the particles to drop into the slag pocket 5.

The flow of the waste gases and preheated air through the recuperators is more clearly illustrated in Fig. 5 wherein, as shown by the arrows, the waste gases are discharged from the passage 24 through passages 25 and 25a to a pair of the recuperators, similar distribution being effected to another pair through passages 26 and 26'. The waste gases then pass downwardly through the recuperator tile 27 to the common collecting chambers 28 and 28a below the tile from which they pass to the stack passage 16. Air enters the bottom horizontal passages of the recuperators, through inlets 30 and 30a, traversing back and forth in heat exchange relation with the vertical waste gas passages and then pass upwardly to the combustion chambers through the vertical passages 11. Poke holes and plugs 31 are provided above the recuperator tile for cleaning purposes.

In the operation of the furnace, the hearth is charged with material 32, Fig. 6, it being piled high upon the hearth. The products of combustion enter the respective ends of the furnace through the firing ports 10, the burners extending through the burner ports 9 being adjusted as is the volume of the preheated air, to obtain the proper fuel mixture and heat characteristics in the furnace chamber. The degree of preheat may be varied by manipulation of the waste gas dampers 18 to the recuperators, and the damper 29 to the stack. Also the volume of preheat air may be regulated by controlling the volume of air admitted through air inlets 30 by suitable dampers 30b or, if desired, a forced supply of air may be directed into the recuperators by blowers.

As shown in lines and arrows in Fig. 6, the heating flame and products of combustion will follow the contour of the charge, and instead of rising at the center of the furnace chamber, will drop in the direction of the waste gas exit, thus keeping the heating medium in intimate contact with the charge at all times.

The result of the dual-firing of the charge and control of the application of the heating medium to the charge is graphically illustrated by the curve shown in full lines in Fig. 7 in which the base line or abscissa A represents the extreme length of the hearth, and the vertical lines or ordinates O the range of temperatures in the chamber.

The respective ends of the curve represent the temperatures of about 2000° F. and the maximum temperature of the curve is designated at about 3300° F. There is a very slight drop in the peak flame temperature at substantially the center of the hearth where the waste gases exit through the outlet ports 6 or 15. The dotted line curve represents the temperatures prevailing in the regenerative type open hearth furnace, wherein the maximum temperature is reached about one-third of the distance in form one side of the hearth, this maximum temperature being considerably greater than the maximum temperature of the curve in the dual fired furnace. As previously explained, a higher temperature prevails in the regenerative firing type furnace because of the need for prolonging the burning characteristics of the fuel and higher initial temperatures are necessary to maintain a sufficiently high temperature of the exiting waste gases for proper temperature conditions on the exit side of the furnace chamber.

Any reduction in the maximum temperature as prevails in the applicants' dual fired type furnace effects a reduction in all normal furnace losses such as loss of the heat by radiation and deterioration of the refractories.

Area A' represents an excess of temperature due to faulty method of firing. It takes the flame temperature into the zone of failure of commercial refractories permissible in an industry producing steel on a large scale basis. The applicants' new method of firing permits and provides a higher average temperature across the entire hearth without the excess temperature which is now very destructive to the roofs of existing furnaces. The furnace is continuously fired with two shorter flames from ports of constant calibration, thereby maintaining the same relative metal temperature at each end of the furnace, increasing melting rates, decreasing fuel consumption, reducing maintenance and further providing the correct arrangement for the application of combustion control and furnace pressure regulation by the well known automatic devices available for the purpose.

It is also evident from the comparison curves of Fig. 7 that a more uniform temperature condition prevails throughout the bath of metal supported by the hearth. Thus for example the charge is brought to temperature more rapidly than in the regenerative type and more uniform temperatures are maintained throughout the length of the hearth, which results in a substantial reduction of time for each heat of the open hearth furnace. This is an important factor as it increases the capacity of the furnace and results in a substantial saving in the cost of open hearth steel.

Although several embodiments of the invention have been herein illustrated and described, it will be apparent to those skilled in the art that various modifications may be made in the details of construction without departing from the principles herein set forth.

We claim:

1. The method of melting and refining steel in an open hearth furnace which comprises placing a charge on the hearth structure, directing a melting flame to substantially the level of the charge from opposite ends of the charge to blanket the charge with the products of combustion, and withdrawing the products of combustion downwardly through substantially the center of the charge to keep the heating medium in intimate contact with the charge at all times.

2. In an open hearth furnace for melting and refining steel, a furnace chamber of substantially rectangular shape having a pair of firing ports at opposite ends on the longitudinal axis of the chamber and a waste gas exit intermediate the firing ports, said exit port having its axis vertically disposed and having its exit passage beginning in a plane below the firing ports of said furnace whereby the products of combustion travel in dual paths parallel with the surface contour of the charge on the furnace hearth.

WILLIAM A. MORTON.
HOWARD F. SPENCER.